United States Patent
Blanpain et al.

(10) Patent No.: US 9,527,582 B2
(45) Date of Patent: Dec. 27, 2016

(54) AIRCRAFT UNDERCARRIAGE LEG INCLUDING A UNIT FOR DRIVING THE WHEELS

(71) Applicant: MESSIER-BUGATTI-DOWTY, Velizy-Villacoublay (FR)

(72) Inventors: Thierry Blanpain, Velizy-Villacoublay (FR); Edouard Campbell, Velizy-Villacoublay (FR); Yann Simonneaux, Velizy-Villacoublay (FR); Martial Monseu, Velizy-Villacoublay (FR); Remi Finet, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 190 days.

(21) Appl. No.: 14/447,825

(22) Filed: Jul. 31, 2014

(65) Prior Publication Data

US 2015/0314859 A1 Nov. 5, 2015

(30) Foreign Application Priority Data

Aug. 2, 2013 (FR) ...................................... 13 57750

(51) Int. Cl.
*B64C 25/40* (2006.01)
*B64C 25/18* (2006.01)

(52) U.S. Cl.
CPC .............. *B64C 25/18* (2013.01); *B64C 25/405* (2013.01); *Y02T 50/823* (2013.01)

(58) Field of Classification Search
CPC ........ B64C 25/18; B64C 25/40; B64C 25/405; B60K 7/00; B60K 7/0061; B60K 25/08
USPC ...................................... 244/103 R, 103 S, 50
See application file for complete search history.

(56) References Cited

U.S. PATENT DOCUMENTS

| | | | | |
|---|---|---|---|---|
| 2,347,986 A | * | 5/1944 | Bowerman | B64C 25/40 244/103 S |
| 3,542,318 A | * | 11/1970 | Ellsworth | B64C 25/40 244/103 S |
| 3,850,389 A | | 11/1974 | Dixon | |
| 8,579,229 B2 | * | 11/2013 | Nierlich | B64C 25/405 244/103 R |
| 8,616,493 B2 | * | 12/2013 | Gaia | B64C 25/405 244/103 S |
| 9,139,291 B2 | * | 9/2015 | Himmelmann | B64C 25/405 |
| 9,169,004 B2 | * | 10/2015 | Essinger | B64C 25/405 |
| 2011/0156472 A1 | | 6/2011 | Bucheton et al. | |

(Continued)

FOREIGN PATENT DOCUMENTS

FR 2 954 234 A1 6/2011
FR 2 954 752 A1 7/2011

OTHER PUBLICATIONS

French Search Report for FR 13 57750 dated Apr. 24, 2014.

*Primary Examiner* — Philip J Bonzell
*Assistant Examiner* — Marc Burgess
(74) *Attorney, Agent, or Firm* — Sughrue Mion, PLLC

(57) ABSTRACT

Aircraft undercarriage leg including an axle (3) that bears at least one wheel (4), the undercarriage leg being equipped with a unit (6) for driving rotation of the wheel, wherein the drive unit is rigidly fixed to the axle and a deformable support (12) extends between a cantilevered portion of the drive unit and a portion of the undercarriage leg not including the axle to support the cantilevered portion of the drive unit.

3 Claims, 4 Drawing Sheets

(56) References Cited

U.S. PATENT DOCUMENTS

2011/0304292 A1* 12/2011 Charuel ................ B64C 25/405
                                                       318/450
2012/0217340 A1    8/2012 Essinger et al.
2013/0026284 A1*  1/2013 Christensen .......... B64C 25/405
                                                       244/50
2015/0210385 A1*  7/2015 Didey ................... B64C 25/405
                                                       244/50

* cited by examiner

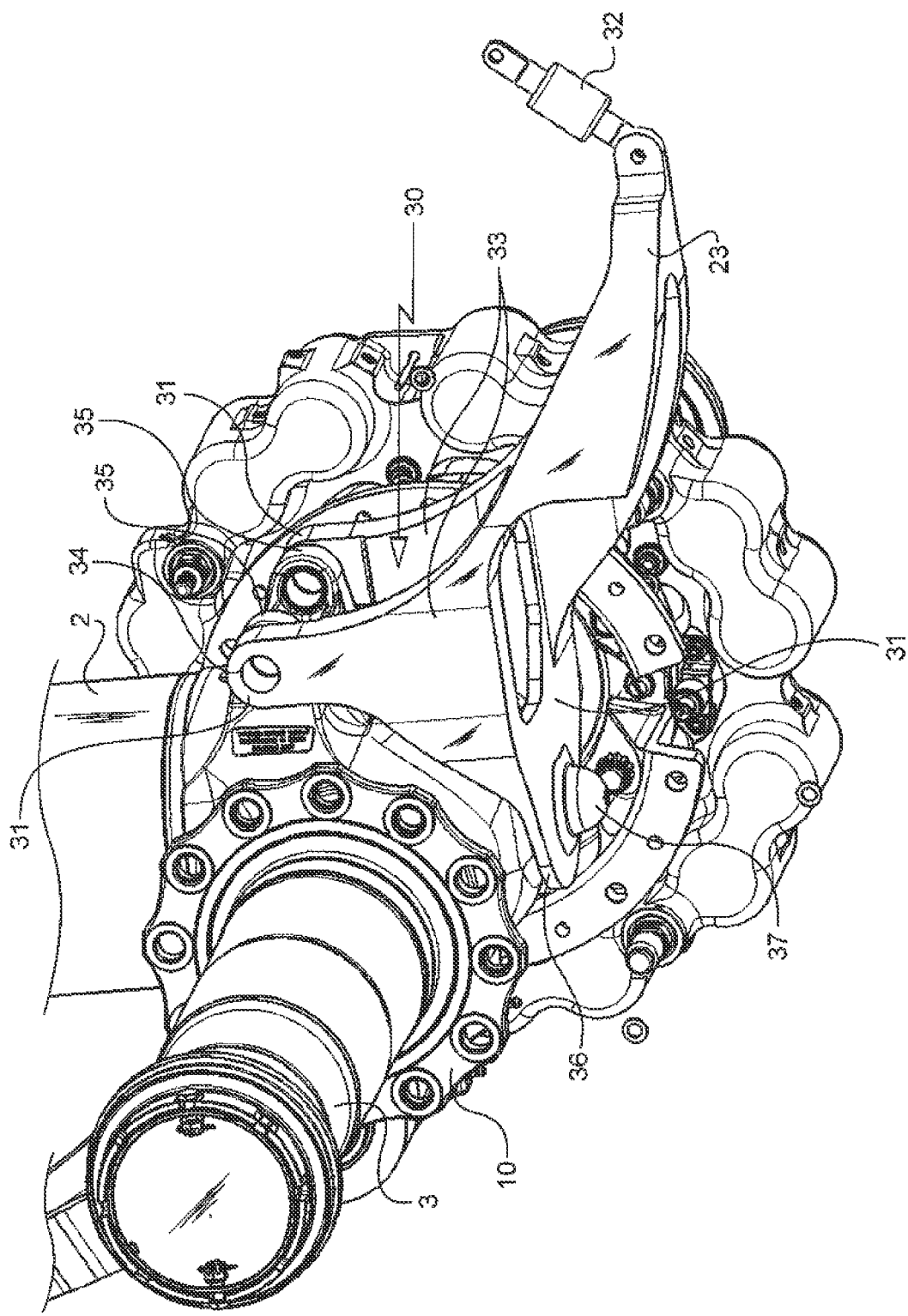

AIRCRAFT UNDERCARRIAGE LEG INCLUDING A UNIT FOR DRIVING THE WHEELS

The invention relates to an aircraft undercarriage leg including a unit for driving the wheels.

TECHNOLOGICAL BACKGROUND OF THE INVENTION

Undercarriage legs including units for driving the wheels are known, for example described in application FR 2 954 752. The unit for driving a wheel of the undercarriage leg is carried by a ring that receives the pistons of the brake equipping the wheel.

When the aircraft is on the ground, the undercarriage leg is deformed. In particular, the axle bearing the wheel bends to a non-negligible extent. It is therefore important to be able to take account of this deformation, which may lead to movement of the drive unit relative to the wheel.

OBJECT OF THE INVENTION

The object of the invention is to propose a new mounting for the drive unit enabling bending of the axle bearing the wheel to be absorbed.

SUMMARY OF THE INVENTION

To achieve this object, there is proposed an aircraft undercarriage leg including an axle that bears at least one wheel, the undercarriage leg being equipped with a unit for driving rotation of the wheel. In accordance with the invention the drive unit is rigidly fixed to the axle and a deformable support extends between a cantilevered portion of the drive unit and a portion of the undercarriage leg separate from the drive unit.

Thus the drive unit is fixed to the axle itself as close as possible to the wheel so that the drive unit naturally follows the deformation of the axle, which minimizes the movement between the wheel and the drive unit. Its cantilevered portion, essentially the motor of the unit, is then supported by the deformable support, which is connected to a rigid part of the undercarriage leg, thus preventing excessive vibration.

BRIEF DESCRIPTION OF THE FIGURES

The invention will be better understood in the light of the following description of an undercarriage leg in accordance with one particular embodiment of the invention with reference to the figures of the appended drawings, in which:

FIG. 5 is a perspective view of an undercarriage leg in accordance with one embodiment of the invention equipped with a frame adapted to receive the deformable support;

DESCRIPTION OF ONE PARTICULAR EMBODIMENT OF THE INVENTION

Figure 1:
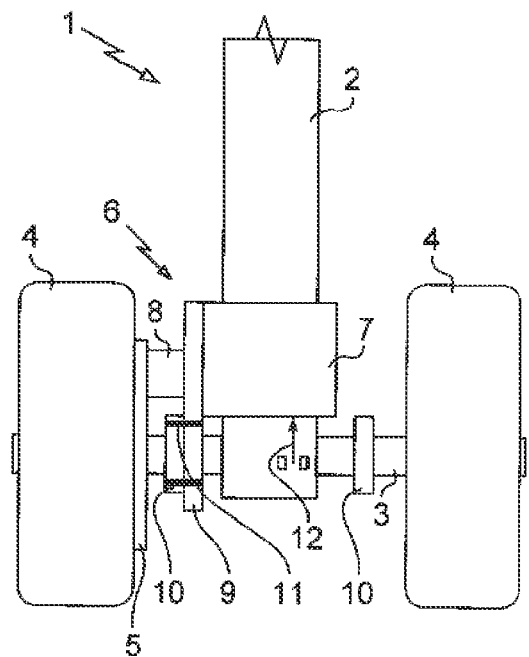
FIG. 1 is a diagrammatic front view of an undercarriage leg including a wheel drive unit.
Figure 2:
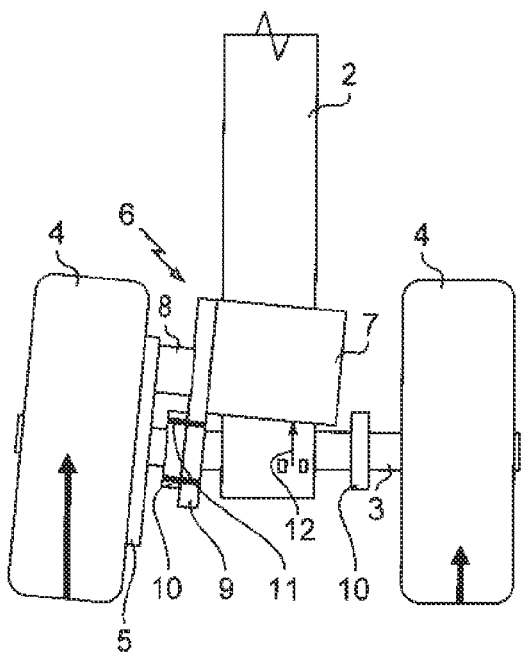
FIG. 2 is a view of the same undercarriage leg in which the bending of the axle is exaggerated.

The undercarriage leg in FIGS. 1 and 2 includes an undercarriage leg 1 including a strut assembly that is attached to an aircraft and in which slides a sliding rod 2 that bears at its lower end an axle 3. Here the axle 3 carries two wheels 4. As shown in an exaggerated manner in FIG. 2 for one of the wheels, the axle is liable to bend upwards because of ground forces to which the undercarriage leg 1 is subjected, the effect of which is to tilt the corresponding wheel. The effect is not negligible and the tilt can reach one degree.

Here one of the wheels is shown equipped with a drive ring 5 that cooperates with a unit for driving rotation of the wheel, here a drive actuator 6. To this end, the actuator 6 includes a body 7 enclosing an electric motor associated with a reduction gear unit to drive an output gear 8 that cooperates with the drive ring 5 to drive rotation of the corresponding wheel 4.

Figure 3:
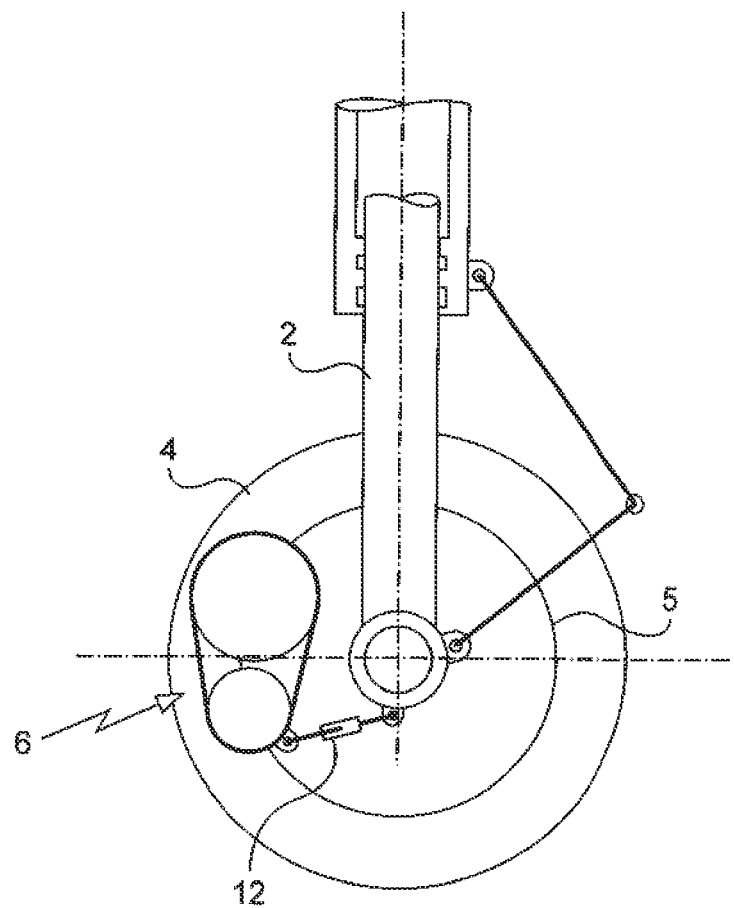
FIG. 3 is a side view of the undercarriage leg from FIGS. 1 and 2 omitting one of the wheels.

Here the axle 3 includes flanges 10 each of which is used to fix a brake (not represented here). In accordance with the invention, the actuator 6 includes a flange 9 that is adapted to be fixed directly to the axle flange 10, for example by means of bolts 11. As a result, the actuator follows the bending of the axle, which minimizes the movement of the output gear 8 relative to the drive ring 5. Moreover, a deformable support 12 is disposed between the cantilevered portion of the actuator body 7 and the sliding rod 2 of the undercarriage leg 1 to support the actuator and to prevent the undesirable effects of a high cantilevered mass. This deformable support 12 tends to take some of the weight of the actuator and also serves to damp any vibration of the cantilevered portion of the actuator. The deformable support 12 is diagrammatically symbolized in FIGS. 1 and 2 by an arrow and shown in FIG. 3 in the form of a deformable abutment with damping capacity.

Figure 4:
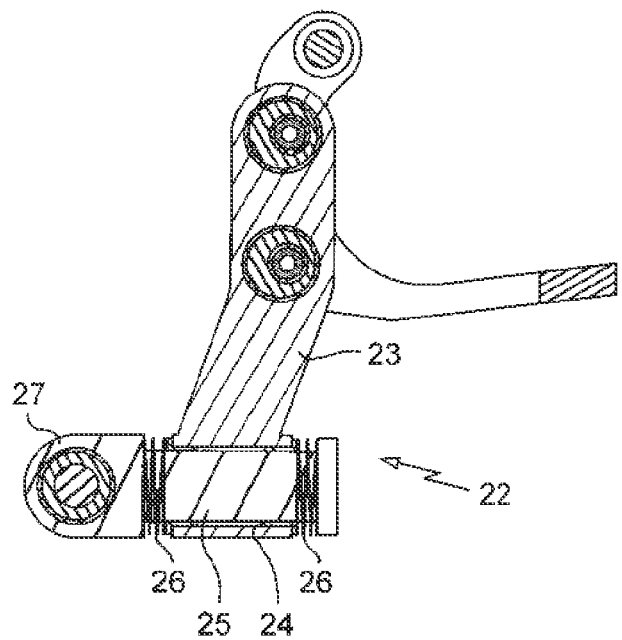
FIG. 4 is a diagrammatic view in section of one example of a deformable support in accordance with the invention.

The deformable support may take a variety of forms. For example, the deformable support 22 in FIG. 4 includes an arm 23 that is rigidly fixed to the sliding rod 2. At the lower end of the arm 23 is a bore 24 receiving a slider 25 that slides freely in the bore against return springs 26 urging the slider 25 toward the intermediate position shown. One of the ends of the slider 25 carries an eyelet 27 to be fastened to the cantilevered portion of the rotation drive actuator 6.

In the FIG. 5 example, the arm 23 is part of a frame 30 including a plate 31 that extends under the undercarriage leg and from which the arm 23 projects and bears at its end a damper 32 forming the deformable support proper. From the plate 31 extend two lugs 33 terminated by yokes 34 enabling the frame 30 to be pinned onto yokes 35 of the sliding rod of the undercarriage leg (the pin is not represented here). Moreover, the plate 31 terminates in an eyelet 36 that surrounds a lifting ball 37 disposed at the lower end of the sliding rod 2 of the undercarriage leg. The frame 30 is therefore rigidly fixed to the sliding rod.

Figure 6:
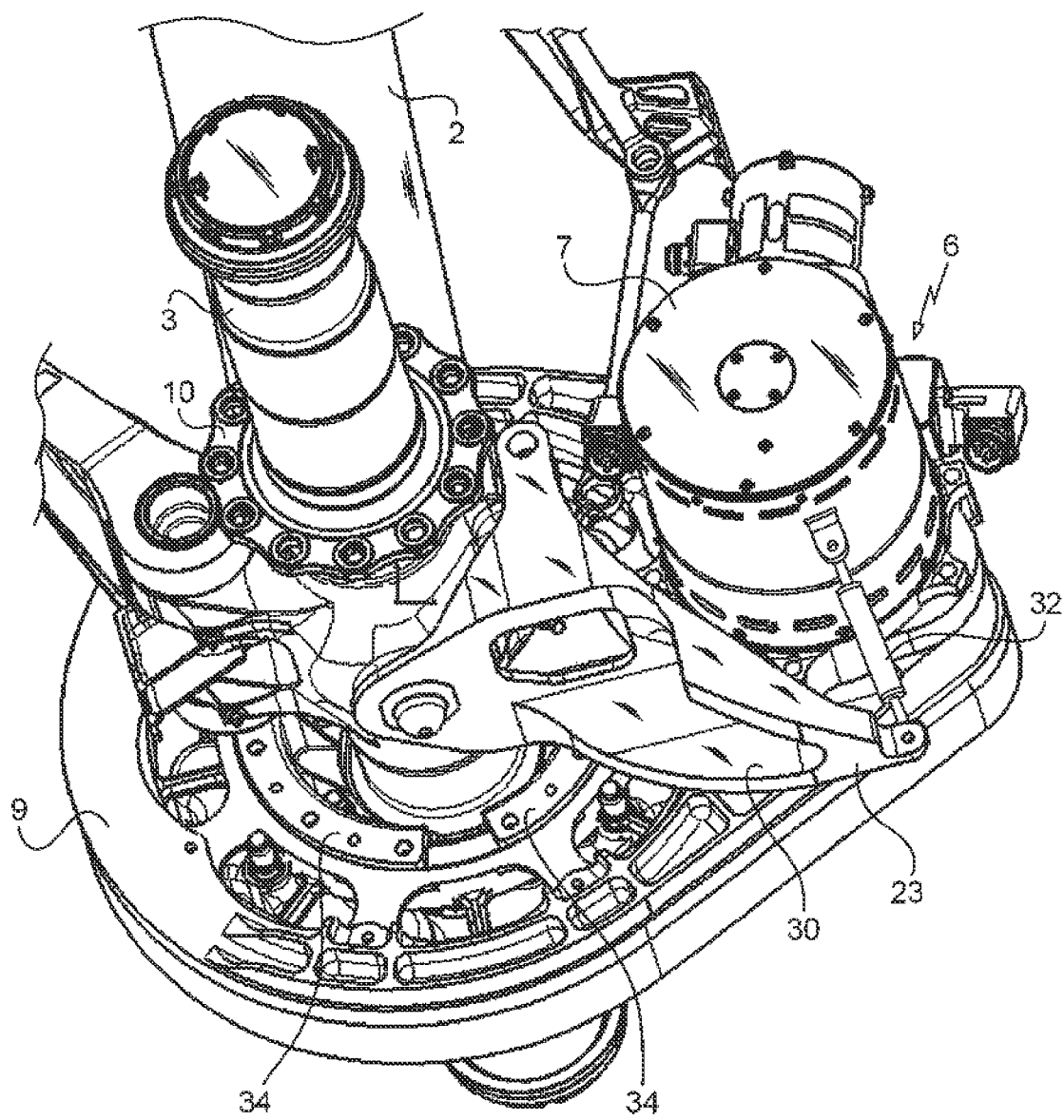
FIG. 6 is a perspective view of the undercarriage leg from FIG. 5 with one of the drive actuators mounted on the undercarriage leg.

FIG. 6 shows how the damper 32 extends between the end of the arm 23 and the motor 7 of the actuator 6 to constitute a deformable support, the fixed support consisting here of angle-irons 34 that are fixed to the axle flange 10 (which is hidden here, but is similar to that seen on the other side of the axle) and on which the flange 9 of the actuator 6 is mounted.

The invention is not limited to what has just been described but to the contrary encompasses any variant within the scope defined by the claims. In particular, although it is indicated here that the rotation drive unit is fixed to an axle flange, it could be fixed to the axle in any other way. It may for example include a body with an orifice in which a non-cylindrical portion of the axle is engaged, which prevents it from rotating. It may equally be fixed to a pin passing through the axle. Moreover, the deformable support may take any form provided that it is able to absorb movement of the cantilevered portion of the drive unit relative to the portion of the undercarriage leg to which it is connected.

The invention claimed is:

1. Aircraft undercarriage leg including an axle (3) that bears at least one wheel (4), the undercarriage leg being equipped with a unit (6) for driving rotation of the wheel, characterized in that the drive unit is rigidly fixed to the axle and a deformable support (12; 22) extends between a cantilevered portion of the drive unit and a portion of the undercarriage leg not including the axle to support the cantilevered portion of the drive unit.

2. Undercarriage leg according to claim 1, wherein the drive actuator is fixed to an axle flange (10) that is also used to fix a brake of the wheel.

3. Undercarriage leg according to claim 1, wherein the deformable support (22) includes an arm (23) rigidly connected to a rod of the undercarriage leg bearing the axle, the arm receiving a slider (25) mounted to slide on the arm and urged toward an intermediate position, the slider including means (27) for attaching it to the cantilevered portion of the actuator.

* * * * *